United States Patent
Satkunarajah et al.

(10) Patent No.: US 10,268,740 B2
(45) Date of Patent: Apr. 23, 2019

(54) 3D ANALYTICS ACTIONABLE SOLUTION SUPPORT SYSTEM AND APPARATUS

(71) Applicants: Tharmalingam Satkunarajah, Garden City, NY (US); Kalayini Sathasivam, Garden City, NY (US)

(72) Inventors: Tharmalingam Satkunarajah, Garden City, NY (US); Kalayini Sathasivam, Garden City, NY (US)

(*) Notice: Subject to any disclaimer, the term of this patent is extended or adjusted under 35 U.S.C. 154(b) by 433 days.

(21) Appl. No.: 14/959,433

(22) Filed: Dec. 4, 2015

(65) Prior Publication Data
US 2017/0109422 A1    Apr. 20, 2017

Related U.S. Application Data

(60) Provisional application No. 62/241,394, filed on Oct. 14, 2015.

(51) Int. Cl.
| | |
|---|---|
| G06F 17/30 | (2006.01) |
| G06T 17/05 | (2011.01) |
| G06T 17/00 | (2006.01) |
| G06K 9/62 | (2006.01) |

(52) U.S. Cl.
CPC .. *G06F 17/30572* (2013.01); *G06F 17/30241* (2013.01); *G06F 17/30554* (2013.01); *G06F 17/30569* (2013.01); *G06F 17/30575* (2013.01); *G06T 17/00* (2013.01); *G06T 17/05* (2013.01); *G06K 9/6259* (2013.01); *G06T 2210/04* (2013.01); *G06T 2210/56* (2013.01)

(58) Field of Classification Search
None
See application file for complete search history.

(56) References Cited

U.S. PATENT DOCUMENTS

| | | |
|---|---|---|
| 7,995,055 B1 | 8/2011 | Ma et al. |
| 2012/0256916 A1 | 10/2012 | Kitamura et al. |
| 2013/0121564 A1 | 5/2013 | Kitamura et al. |
| 2014/0006919 A1* | 1/2014 | He ................ G06F 17/241 715/230 |
| 2015/0154467 A1 | 6/2015 | Feng et al. |

OTHER PUBLICATIONS

Li Wenqing et al. A VR_Ocran system for interactive geospatial analysis and 4d visualization of the marine environment around Antarctica. Apr. 2011. Computers & Geosciences. pp. 1743-1751.*

* cited by examiner

*Primary Examiner* — Tuankhanh D Phan
(74) *Attorney, Agent, or Firm* — David P. Olynick (57) ABSTRACT

The claimed invention relates to a system and method for generating actionable intelligence and information by utilizing a multi-sensor, multi-temporal; multi-spatial, multi-format data (mSTSFA) architecture stored in a NoSQL data architecture to qualify spatial (accuracy) and contextual information integrated into a real time Engineering Grade location based analysis and predictive analytics engine returning users based queries in a 3D visualization including Virtual Reality (VR)/Augmented Reality functionality. The present invention is a systemized platform for handling geospatial, geophysical, financial, temporal and attribute data input directly to analyze the datasets to serve the operational and business needs of the industries such as transportation, water, environmental, engineering, telecommunication, finance, energy, natural resources, defense and security.

20 Claims, 5 Drawing Sheets

3D ANALYTICS ACTIONABLE SOLUTION SUPPORT SYSTEM AND APPARATUS

1. CROSS-REFERENCE TO RELATED APPLICATIONS

This application claims priority to U.S. provisional application Ser. No. 62/241,394, filed Oct. 14, 2015, which is hereby incorporated by reference in its entirety.

2. INTRODUCTION

The present invention describes an apparatus and method for integrating multi-sensor, multi-temporal, multi-spatial, multi-format data from multiple sensors or data stores in a real-time engineering grade location based analysis and predictive analytic 3D data stack and visualizing that data in real-time in response to user inquires.

3. BACKGROUND

Although there are many types of spatial and non-spatial data held by different organizations, agencies, and private companies, the data contained therein is rarely unified or in compatible formats. The disparate nature of the data repositories, formats and structures prevent the maximum utilization of the investment in the data capture, initial analysis and maintenance. Thus, there exists a need therefore for harmonizing the data in a manner that allows these disparate data stores and historical records to be used in furtherance of development goals and tasks.

There are many software and database tools and environments that can access and analyze components or subsets of the data but a comprehensive geo-spatial based solution configured to read and access multi-format data models and real time data transactions is required to solve the complex multi-dimensional problems faced as part of the need for accurate spatial and contextual data to support smart city growth.

Therefore, what is needed is a system and method that provides improved access, conditioning, integrating and visualization of geospatial and other actionable information and utilizing the same to provide answers to user queries regarding the location of various infrastructure and optimal positioning of actions within a defined space. In particular, what is needed is a system and method that provides real-time visualizations that combine data from multiple sources to present a cohesive analysis of the infrastructure and information relating to a specific location and serve the operational and business needs of industries such as Transportation, Water, Environmental, Engineering, Telecommunication, Finance, Energy, Natural Resources, Defense, insurance, retail, city planning, utilities, and Security

4. SUMMARY

In accordance with one aspect that can be implemented in one or more embodiments, the present invention is directed to a collection of networked apparatus or a method for improving the use of incompatible multivariate, multi-sensor, multi-temporal, multi-spatial, multi-format data spatial and non-spatial data obtained from at least one or more sensor devices by transforming the data into compatible formats by accessing and transforming the data into compatible formats within the memory of a computer and generating a 3D visualization thereof configured to provide answers to user queries and predictive analytics. The method comprises using a computer, properly configured, to select a location of interest such as a particular area bound by geospatial data using a geospatial query generator. The query returns a data object that represents a 3D stack of information relating to the particular location. In one arrangement, the 3D stack is constructed is by accessing a plurality of data objects obtained from at least one of a plurality external data sets or active sensor devices using a input module configured as code executing in the processor, wherein the data is relevant to the geospatial data of the inquiry.

More particularly, prior to generating the 3D data stack, each data object obtained from the plurality of external data sets or sensors is evaluated for proper format type using a format check module configured as code executing in the processor. The format check module is configured to check the format of the data object against a format array of pre-set object format types, where each element of the array contains reference to a compatible format type and the module further configures the processor to identify data objects with an incompatible format type. The processor is configured to store each data object having an incompatible format as an element in a conversion array.

Using a conversion module configured as code executing in the processor, each data object having an incompatible format type is converted into a compatible format type by iterating over each element in the conversion array and identifying a conversion factor for converting the data object to an approved format type, and applying the format factor to obtain a converted data object. These converted data objects are linked to one another and function as a 3D data stack for a given location.

The resulting 3D data stack is transmitted to a computing device that generates a three-dimensional visualization of the 3D data stack and allows the user to view and inspect the data represented by the 3D data stack either remotely or at the location corresponding to the query. The computing device is, in one implementation, a Virtual Reality and/or Augmented Reality hardware and software system that utilizes the 3D data stack to generate immersive environments to analyze and evaluate the user's queries. Any data obtained or input into the computing device is then used to update the 3D data stack in real-time.

These and other aspects, features and advantages of the present invention can be further appreciated from the following discussion of certain more particular embodiments thereof.

5. BRIEF DESCRIPTION OF THE DRAWINGS

The foregoing and other features of the present invention will be more readily apparent from the following detailed description and drawings of one or more exemplary embodiments of the invention in which.

6. DETAILED DESCRIPTION

By way of overview and introduction, the present invention concerns a system and method for accessing, transforming and visualizing spatial and non-spatial data related to a geographic location and providing such a transformations and visualizations to a remote computing device, such as a smart phone, virtual reality interface (VR), augmented reality (AR) interface device, or autonomous or semiautonomous device.

Specifically, the present system and method are directed to running queries in a data object database for a geographic location and receiving a customized data package that combines available geospatial data, contextual data, metadata and predictive data that provides a custom solution to the user query. Such a data stack, when implemented in a 3D environment is used to provide actionable information to entities in the Transportation, Water, Environmental, Engineering, Telecommunication, Finance, Energy, Natural Resources, Defense, Insurance, Retail, City planning, Utilities (e.g. Gas, Oil, Electric), and Security industries.

6.1 System Overview

Figure 1:
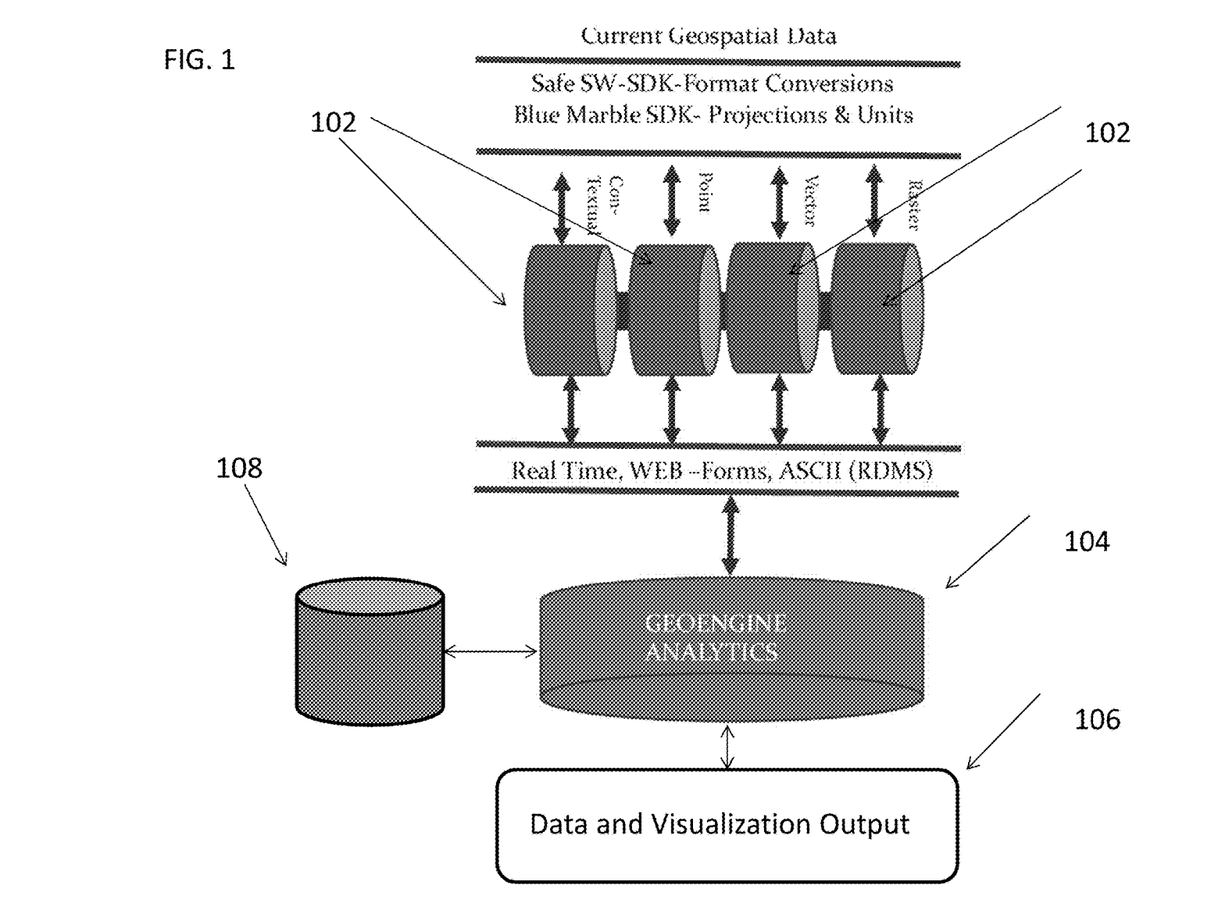
FIG. 1 is an overview block diagram detailing the arrangement of elements of the system described herein in accordance with one embodiment of the invention.

Turning to FIG. 1, a block diagram of the overall system 100 is provided. As shown, current geospatial data in a variety of data (e.g. raster, vector, point, contextual, point, dynamic/sensor) are stored in a plurality of external databases 102. The databases have a connection to the present geospatial analytic system 104. In one particular configuration, the databases 102 are SQL, NoSQL, flat, relational, object or other commonly used databases types and schema. In the illustrated configuration, each of the databases 102 are remote to the analytic system 104 and connections between the external databases 102 and the analytic system are accomplished by network connections (shown as red arrows).

The external databases 102 are configured to contain accessible data relating to specific geographic locations, including data feeds or streams obtained from direct and remote sensing platforms. The data, in one embodiment, is stored in one or more proprietary vendor formats. For example, one or more of the external databases 102 stores data obtained from ultra, high, medium and low resolution or accuracy sensor devices. The sensor devices might use optical, laser, radar, thermal, sonar/acoustic, seismic, bathymetric, and geological sensors owned or operated by private companies, government agencies or other organizations. In a particular embodiment, these sensors are space-based, airborne-based, ship-based, vehicle-based, hand-held, or permanent terrestrial installations that provide periodic, single use, or continuous feeds and steams of data relating to physical conditions and properties under observation and analysis. In one particular arrangement, the data stored in the external databases 102 and accessed by the analytic system 104 are geospatial data files or data objects. The external databases 102 also contain archival records, customer, survey, municipal, zoning, geologic, environmental and other data collected over time by various governmental, scientific, or commercial entities. In one embodiment, the data and associated metadata obtained from sensors is stored in SQL format databases in the form of spreadsheets, tabular, textual, html/XML or other file or formats.

Figure 3:
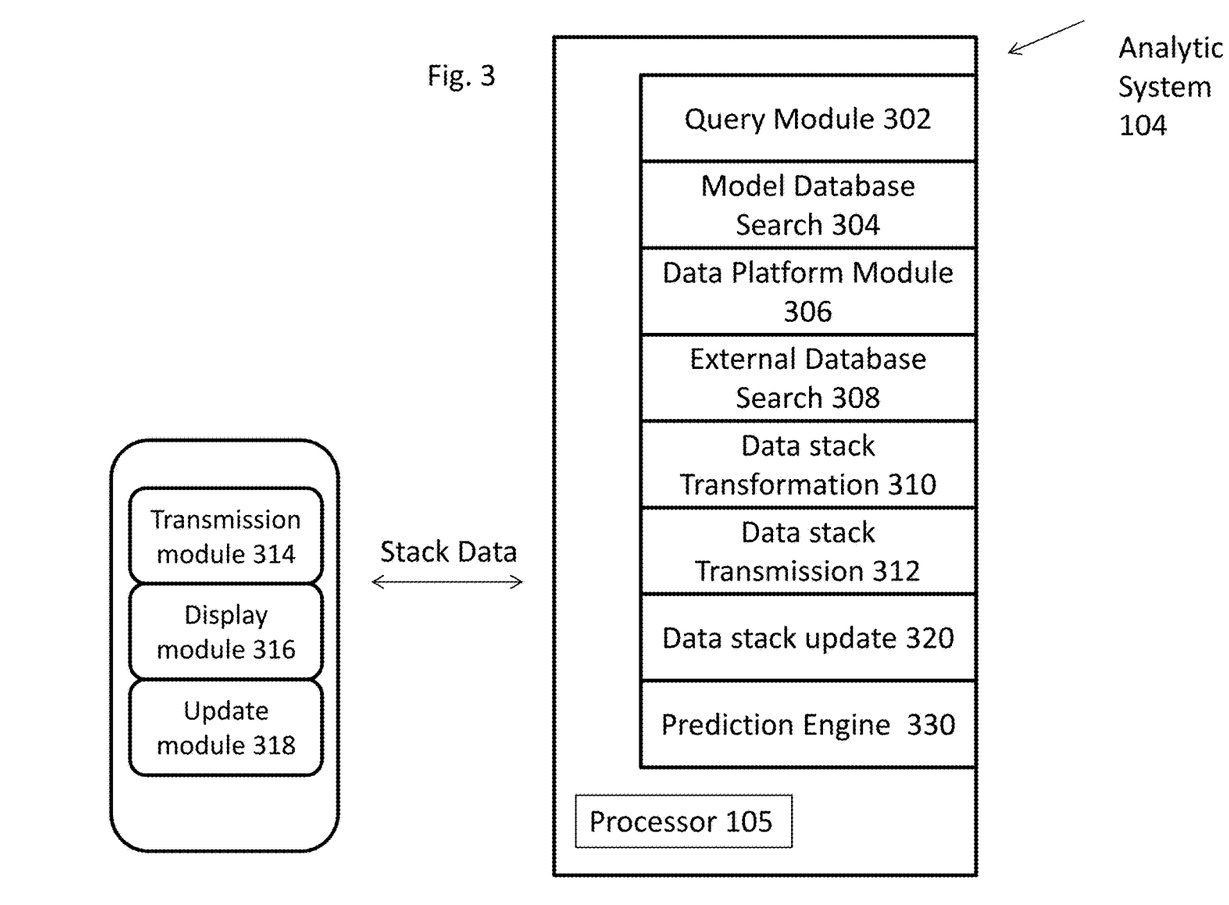
FIG. 3 is a block diagram of an example system in accordance with an embodiment of the present invention.

The geospatial analytic system 104 is configured to access and transform data obtained from the external databases 102. In one arrangement, the analytic system 104 is a computer equipped with a one or more processors (as shown in FIG. 3), RAM and ROM memory, network interface adaptors and one or more input or output devices. In a further arrangement, the analytic system 104 is a computer server or collection of computer servers, each server configured to store, access, process, distribute or transmit data between one another and other computers or devices accessible or connectable therewith. In still a further implementation, the analytic system 104 is a hosted server, virtual machine, or other collection of software modules or programs that are interrelated and hosted in a remote accessible storage device (e.g. cloud storage and hosting implementation) that allows for dynamically allocated additional processors, hardware or other resources on an "as-need" or elastic need basis. Furthermore, elastic load balancing algorithms are utilized to ensure that sufficient back-end capacity is present to enable the system to handle multiple concurrent connections and requests.

A model database 108, such as a NoSQL database, is connected to the analytic system 104 and is used to store data output from the processing of input data from the geospatial databases 102. In an alternative configuration, the model database 108 is a SQL, relational, flat, object or other configuration database. The model database stores model data objects (MDO) that represent a collection of data elements corresponding to a particular geographic location, structure or entity. However, in further arrangements, the MDO contains links to other MDOs in close proximity to the location in question. In this way queries that request information within a radius or given distance from a location can also be utilized and accessed. The NoSQL database 108 uses an Object Based intelligence (OBI) architecture such that a data object representing a tangible or intangible item (e.g. person, place, thing) exists only in a single place across time or at an instant in time. The NoSQL database is, in one configuration, implemented with BIM (Building Information Modeling) architecture. BIM architecture allows for the MDOs to be associated with additional information or features. For instance, a detailed design, building analysis, documentation, fabrications, construction 4D/5D, construction logistics, operation and maintenance, demolition, renovation, programming and conceptual design data is included in the MDO.

In one non-limiting example, a MDO for a particular address contains information about the subterranean infrastructure present at the address as well as other data relating to the same. All of other MDOs relating to a particular geographic location such as specific MDOs detailing zoning regulations at that location or traffic patterns) are collected and transformed by the geospatial analysis system 104 into a 3D data stack of real time and historical data to a user regarding the geospatial and infrastructure features present at a specific location based on the data from the databases 102.

The real-time and historical data collected into the 3D data stack is provided to a user though a user interface device 106. In one configuration, the user interface device 106 is a desktop computer. Alternatively, the user interface device 106 is a mobile computing device, such as a smart phone or table computer using an Apple® or Android® operating system and/or hardware. In a further example, the mobile computing device is an augmented reality (AR) interface. In one implementation, AR devices function by overlaying data from the analytic system 104 onto the field of vision or view window integrated into the output device 106. In yet a further implementation the input device is a virtual reality device. Virtual reality devices (VR) are immersion technology that projects images, video and data into a sphere encircling the user. Such technology employs motion tracking and other technologies to track a person's movement so as to provide the sensation of total immersion within a projected stage or area. Those possessing the requisite level of skill in the art will appreciate that VR, AR and mobile technology encompasses sufficient processors, software, firmware, audio visual devices, user interfaces, geospatial locators and anatomical tracking technology that is used to implement, construct or display a virtual and version of a real or imaginary location and identify the location of the user therein.

5.2 Accessing Geospatial Data from External Databases

Figure 2:
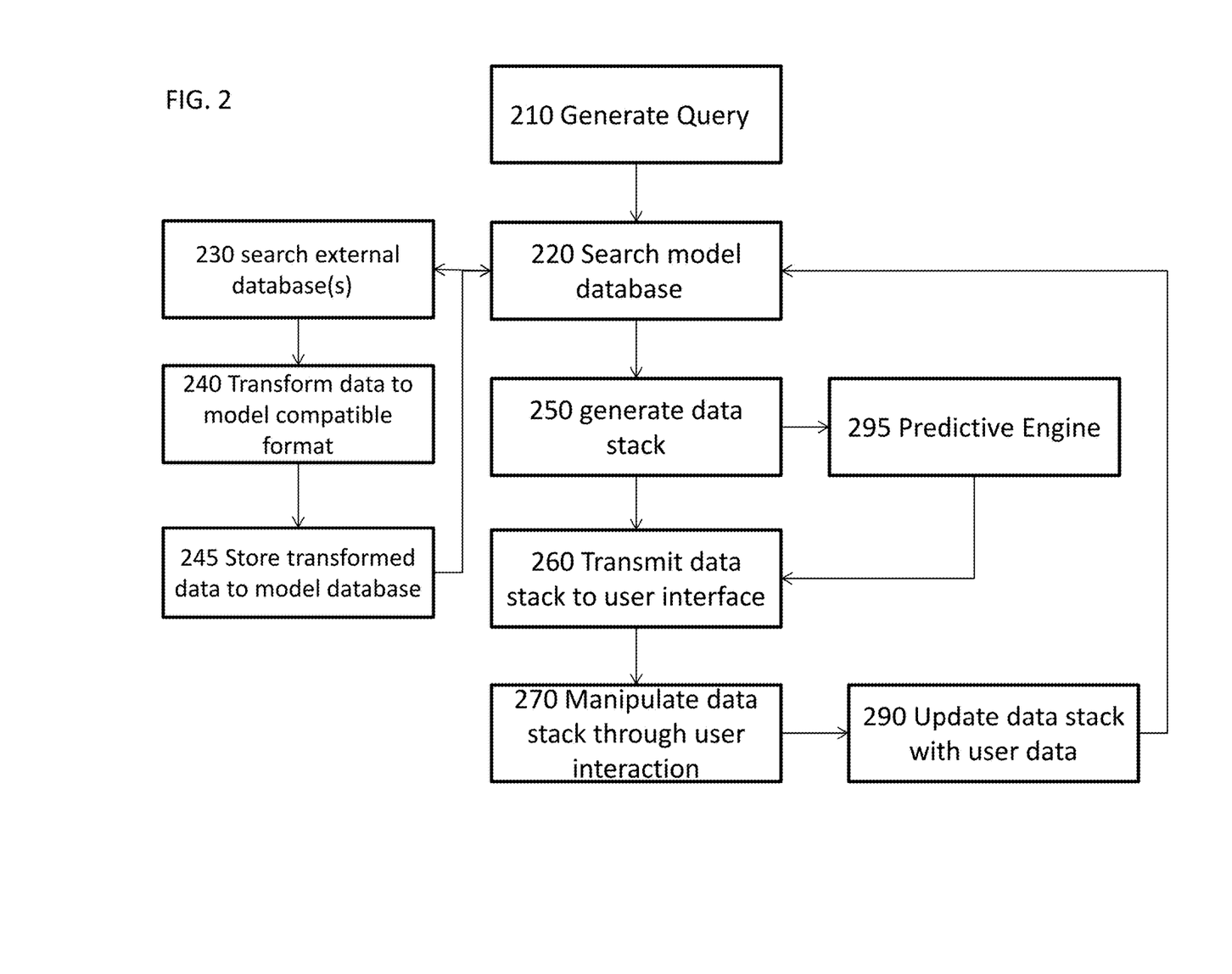
FIG. 2 is a flow diagram detailing the steps of an embodiment of the method as described herein.

FIG. 2 details particular work-flows in accordance with aspects of the invention. The steps shown in FIG. 2 can be carried out by code executing within the memory of the processor 102, as may be organized into one or more modules, or can comprise firmware or hard-wired circuitry as shown in FIG. 3. For simplicity of discussion, the code referenced in FIG. 3 is described in the form of modules that are executed within a processor 105 of the analytic system 104 and which are each organized to configure the processor 105 to perform specific functions. The block diagram of FIG. 3 provides exemplary descriptions of the modules that cooperate with a memory and processor 105 of the analytic system 104 and cooperate to implement the steps outlined in FIG. 2. Those possessing an ordinary level of skill in the art will appreciate that any processor of the analytic system can comprise a plurality of cores or discrete processors, each with a respective memory, which collectively implement the functionality described below, together with associated communication of data there between.

With reference now to FIGS. 2 and 3, the geospatial data transformation is initiated and implemented by at least one query module 310 which comprises code executing in the processor 102 to access and search the records in the model document database 108 according to step 210. In one particular implementation, the query generated according to step 210 is a given set of coordinates or other location identifiers e.g. place name, survey plot, or beacon serial number. In an alternative arrangement, the query generated is contextual. In this arrangement additional data, e.g. coordinate location of the user is also generated and supplied as part of the query. Furthermore, additional query types, such as semantic, spatial, contextual, remote sensing, situational or temporal queries are envisioned. For instance, a semantic query might entail encoding in search parameters a request for the location and history of all underground utilities within a 75 foot radius of a given address along with design plans and any updated records in the last two years for a particular utility provider. In particular embodiments, queries can be voice input, text input or contextual using images or video of a specific location. Depending on the query type, additional modules used to enable voice to text conversions and image recognition module. For instance, natural language processing interfaces and speech recognition applications are deployed to parse the input and pass it to the remaining modules.

Figure 5:
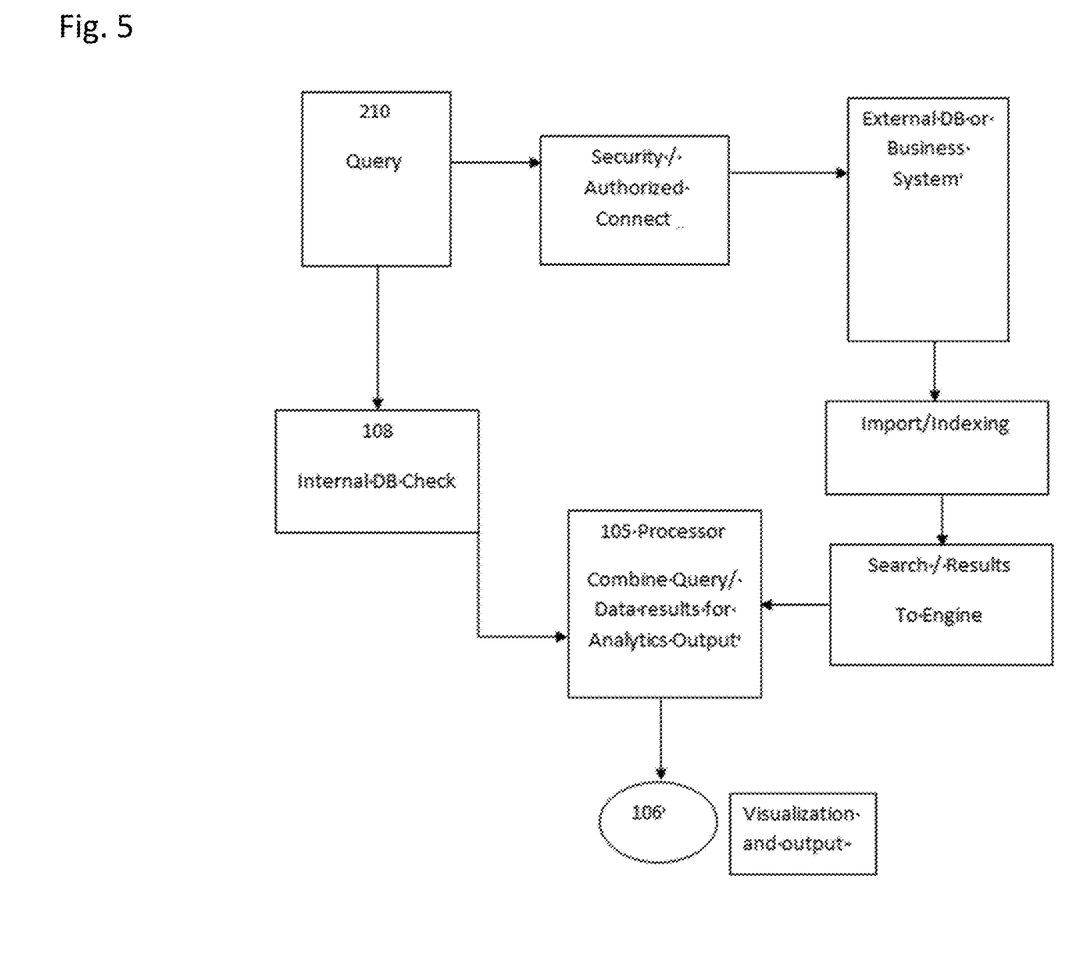
FIG. 5 is a flow diagram detailing the particular steps of an embodiment of the system as described herein.

In a particular embodiment, the user's requests or inputs are used as queries are used to generate a data return. In one non-limiting example, the queries contain or include specific coordinates, geographic markers or references corresponding to an entry or collection of entries stored within the NoSQL database 108. In a further embodiment, the model document database 108 is a geospatial "global map" as per FIGS. 2 and 5. In the present embodiment, all data vector, raster, imagery, text, video is either natively geo-referenced based on relevant source data and formats or is tagged based on a location identifier (e.g. global localization, zip code, latitude and longitude coordinates etc.) of the origin of the data or the query. Queries that do not have location based parameters are, in particular embodiments, defaulted to query origin location with default parameters. In a further arrangement, the model document database 108 implements a "many to many" relationship which allows for targeted spatial data (e.g. the data stack) by default or inference. The location search can be based on point (discreet location, user location (viaLBS) or area users defined (via GUI, contextual or test/string based).

The query generated in step 210 is used to search the model database 108 as in step 220. In one implementation, a database search module 220 is used to query or search the model database 108 for data relating to the query. Here, the model database 108 utilizes a building information modeling (BIM) architecture to store a MDO. For example, a query of a specific building address will result in the searching of the model database 108 for a collection of model data objects (combined as a 3D data stack) that represents all of the data corresponding to that building or location. In this way, municipal, infrastructure and other data corresponding to a real-world location is sent for transformation by a data platform module 306. In one embodiment, the BIM model architecture contains data that allows multiple MDOs to be queried such that an integrated city landscape can be generated from a collection of MDOs representing geographic proximate locations. For example, a number of buildings on either side of a street are each represented by MDOs. The BIM architecture allows for the MDOs to be queried as a group and supplied as a composite 3D stack detailing a particular above ground and subsurface urban landscape.

In particular work-flows where the model database 108 does not contain a specific or generic MDO for the location indicated by the query, a search of the remote databases is conducted as in step 230. According to one non-limiting embodiment of the system described, external search model 308 comprises code that configures one or more processors to access and search the remote databases accessible by the analytic system 104. For instance, the external database search module 308 queries municipal, zoning, planning, waste management and utility databases for information relating to the location identified in the query. In a further arrangement, the data obtained from the external databases is passed first through an application or software interface (e.g. Safe SW or Blue Marble) as software development kits, or application programming layers (API) that use real time format conversions, web-forms and ASCII (RMDS) implementations to condition the data prior to handing or passing off to the other modules described herein. In one embodiment, the external databases are connected via a secure authorized socket and the database search module configures the processor to implement the suitable communication protocol. For example, the processor is configured to implement a structured connect routine to access the data models and define the translation and relationships schema for the data. Furthermore, the database search module 308 configures the processor to create an indexing table within the local or remote memory location during the connection/ingest process to enable "real time" searches.

The results of the search of the external databases are then transformed into model data object compatible formats and a model data object is created and stored in the model database as shown in step 240. In one implementation, a data transformation module 310 comprises code that configures the processor to convert the data found in the external databases into model data formats using proprietary or open source algorithms configured to convert file types and transform data types while preserving the fidelity of the underlying content and data.

Additionally, the model data object is stored in the model database and is associated with, linked to or incorporating sub-objects or properties that describe the semantic relation of the given object to other data. Such properties include accuracy values and attributes of the object model, including the scale and class of data as well and inheritance and data lineage. Additionally, the data model object has, in particular embodiments, attributes detailing the history, temporal or dynamic nature of the data, such as time stamps, changes over time, or durations. Furthermore, the model data object has attributes in a particular configuration addressing interoperability of the data, such a spatial attributes and SPARQL information and data. In further implementations, the model data object includes sub-attributes and data relating to cartographic, topographic and area relevant information to update and expand the contextual and semantic attributes of the object model.

Figure 4:
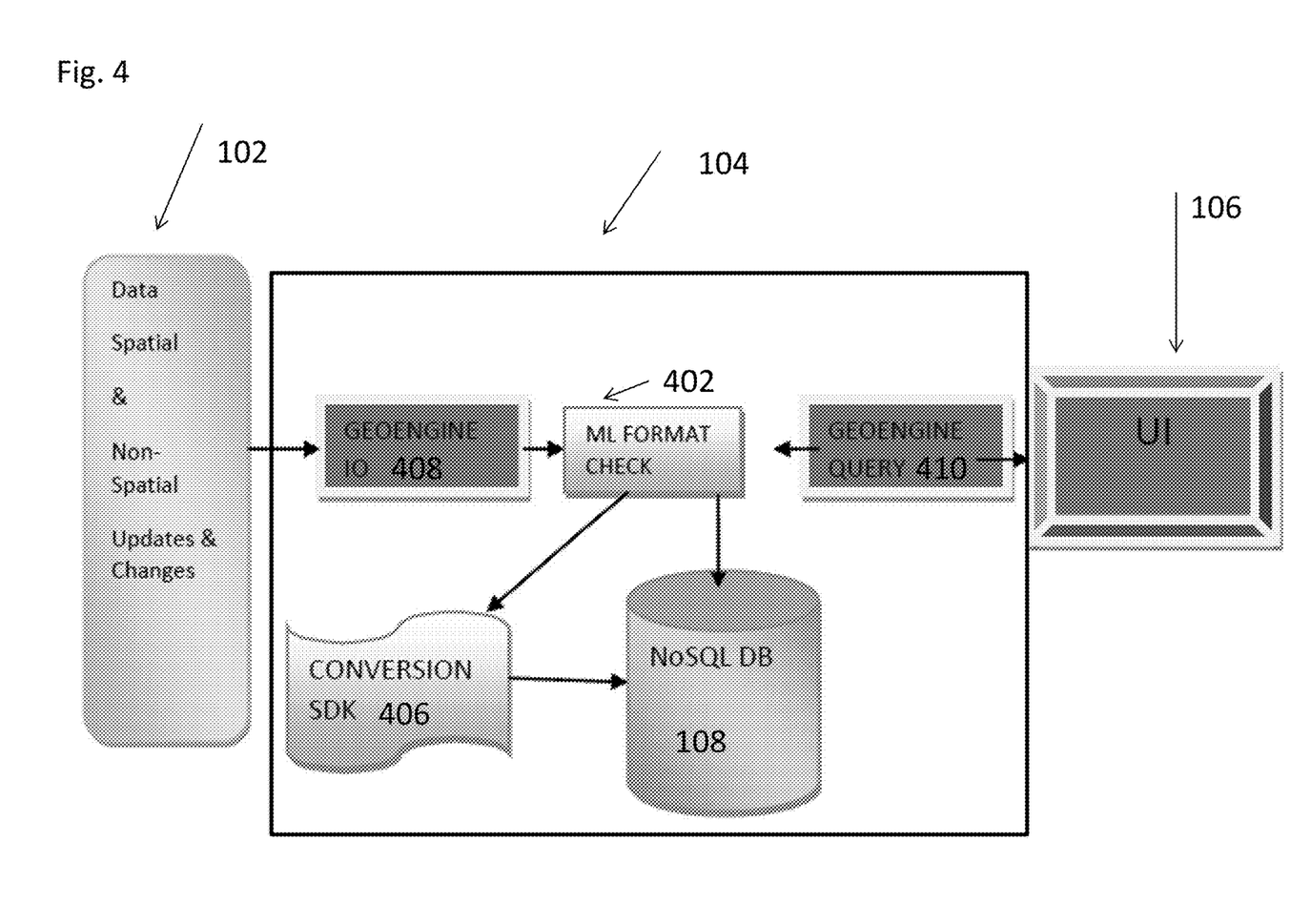
FIG. 4 is a flow diagram detailing the additional steps of an embodiment of the method applied as described herein.

With particular reference to FIG. 4, a user initiated query is parsed using query parse module 410. Where no data relating to the query is identified in the model database 108, the parsed query is used to search the plurality of external databases or sensors 102. The results of this query are received by an input module 408 of the analytic system evaluated for proper format type using a format check module 402 configured as code executing in the processor of the analysis system. The format check module 402 is configured to check the format of the data object against a format array of pre-set object format types, where each element of the array contains reference to a compatible format type and the module further configured the processor to identify data objects with an incompatible format type. The processor is configured to store each data object having an incompatible format as an element in a conversion array.

Using a conversion module 406, configured as code executing in the processor, each data object having an incompatible format type is converted into a compatible format type by iterating over each element in the conversion array and identifying a conversion factor, such as stored within a conversion software development kit 406, for converting the data object stored in the element of the conversion array to an approved format type in the format array, and applying the format factor to the element in the conversion array to obtain a converted data object, the converted data objects are linked to one another and function as a 3D data stack for a given location. In one embodiment, the open source tools include the GDAL (Geospatial Data Abstraction Library) Tools which are released under the Open Source License issued by the Open Source Geospatial Foundation. Such open source tools can include, but are not limited to, tools for conversion/manipulation of raster data formats and vector data formats, including geospatial industry standard formats. Likewise, geospatial projections and geodetic libraries are available through Proj4 public libraries for base geospatial information, definitions and translations.

Upon transformation into a model data compatible format, the converted or transformed data is stored to the model database 108 for further use, as in step 245.

By way on non-limiting examples, the vector data (autocad—.dxg, .dxt, .rvt, .3ds, .ifc; bently—.dgn; Archicad—.3ds obj ifc .vrl; sketchup—.u3d, obj IFC; Google—KML .kmz; ESRI .shp, .sde, GEORSS and GEOJSON file formatted data can be converted using the conversion module. Raster data such as .tff, .img, .jpg, .png format data can be converted as well. Elevation data can also be converted from such formats as las, DTED, ASCII, LSS XSE, xtf, jsf(bathy). Data obtained from dynamic data sensors (e.g. .wav, MP3/4, .avi, xml, .mov, .html, .3gp, .json) can also be converted and used by the system described. Additionally, binary data such as .pdf, .xls, .doc, .txt and .dbf can be input and converted using the conversion modules as described herein.

In a further embodiment, where new or custom data is available, a user may enter this data into the system and convert the data into a model data object. In this arrangement, a user interface for data input is provided. In one arrangement, this user input interface has additional functions beyond data input. In an alternative arrangement, the data input user interface is a standalone component of the system. The user interface for data input allows for the uploading or transfer of data or files to the system. Uploaded data is checked for appropriate data formats. If the uploaded data is not in a compatible format, then the conversion module 406 or another suitable module or submodule is used to convert the data into a compatible format using open source or proprietary conversion modules.

Once the model data corresponding to a particular query has been obtained, either directly from the model database or via transformation of external data sets or user input into a model object compatible format, the data and associated metadata returned by the query is sent to a data stack platform as in step 250. In one arrangement the data stack platform is a software and or hardware appliance configured to take the data object model as an input and construct a virtualized representation of the data. For example, the data stack transformation module 310 is configured to receive the model data object and generate a 3D virtualization of the data suitable for use with 3D configured displays. The data stack transformation module 310 parses the data included in the data module, or the data linked to the data module and generates visual representations or identifiers of the specific features, elements or characterizes of a given location. For example, the transformation module uses or parses data in the MDOs into geographical markup language (GML) or other mapping formation useful for generating visualizations.

By way of example, the 3D virtualization includes parsing the data model to determine the path of buried utility infrastructure on a building site. This information is projected into a 3D virtual space along with information on building plots and zoning envelopes, subsurface structures, above surface structures and other characteristic of the location. Additionally, in implementations where the data model contains temporal information, one of more of the visualized features can be represented in time series such that animations showing the development of a feature of condition over time can be demonstrated in the visualization. In one embodiment, WebGL or similar and successor APIs are used for 3D visualization. Along with the visualization, tables, graphs reports and lists of metadata can be generated and provided to the user or stored in the database.

In a specific embodiment, a game engine or module configured as code executed in the processor 105 is used to visualize, access and manipulate data representing some portion or the entire 3-dimensional data stack. For instance, the game engine configures the processor to render the data stack as a 3-dimensional environment. The 3D stack is stored, in a particular configuration, as language independent JSON format information with specific address with reference to real geographic coordinates.

5.3 Augmented Intelligence Use of the 3D Stack

In a further arrangement of the system and method described, the 3D data stack is used as an input to a predictive engine as in step 295. In one implementation, the prediction engine is configured as a module 330 via code associated therewith and executing in the processor 105 of the analytic system 104. However, in an alternative arrangement, the prediction engine module is remote to the analytic system 104 and hosted as accessible software. The predictive engine module 330 comprises code that configures the processor 105 to analyze the 3D stack for a location in response to a user query regarding a potential event. For example, the prediction engine module configures the processor 105 to analyze the 3D stack and indicate portions of the location that are prone to flooding, or that are anticipated to be prone to flooding in the event of a major weather event. Likewise, the prediction engine is configured to estimate or predict the effect of road closures on traffic, evacuation routes, police response time or logistical and delivery options in response to such weather events. The prediction engine is configured as a neural network that takes historical data and provides probabilities of future outcomes based on an analysis of prior data. In an alternative configuration, the prediction module incorporates cognitive science applications, such as support vector analysis, fuzzy logic, expert systems, neural networks, intelligent agents or other supervised or unsupervised machine learning algorithms utilized to extract data from the model database 108 or the external database(s) 102 to obtain historical information and generate predictions thereof.

For example, in the road traffic scenario described above, where municipality sensors monitor the vehicle density and traffic flow, the predictive engine provides a user of the 3D stack with a suggested list of measures to be taken to reduce congestion based on a set of rules and algorithms.

In another embodiment, the predictive module is configured to compare multi-temporal and multi-spatial aspects of the data stored by the system to integrate queries and predictive analytics to model complex systems and variables which are then presented to a user in 3D/4D (time slices). Such data is then used to model and display solutions based on user defined criteria. This time based analysis can, in one arrangement be used to assist law enforcement, or government agencies in conducting situational and threat assessment utilizing geospatial data.

In further embodiments, the AI system encoded in the prediction module 330 is also configured to generate options or actions in response to a real or hypothetical/simulated event. For instance, in the event of an extreme weather event, the predictive module is configured to generate solutions that would provide alternative evacuation routes, traffic signal control modification to expedite traffic, efficient routing plans for EMS/Fire/police officials, food and shelter logistics and predicated economic and infrastructure damage.

When used in infrastructure planning, the predictive module would provide information regarding housing and impact assessment data, environmental maps, geologic and engineering routes vegetation route analysis, location and co-location of industrial and commercial clients, and physical plane and line security information.

The predictive module uses machine learning to optimize solutions given the variables and goals of the users. This information would enable the generation of new data and information that can be used to update the database and be available to other users. The predictive module is also used to data mine the database(s) 108 or 102 to determine relationships and outcomes of variables to interpret new data and query results.

In a further embodiment, the AI system encoded in a predictive model implements machine learning to generated predictive analysis and information. Those skilled in the art will appreciate that machine learning is an evolution from pattern recognition and computational learning theory in artificial intelligence. As used and understood herein, machine learning represents the analysis and construction of algorithms that can learn from and make predictions on data. Such algorithms operate by building a model from example inputs in order to make data-driven predictions or decisions, rather than following strictly static program instructions.

In one embodiment of the present visualization system and apparatus, the predictive models configures the processor to evaluate different format inputs, and make a comparison between formats, and checks the date on timely basis and extrapolates and predicts future events and circumstances and provide solutions thereto. Machine learning is closely related to computational statistics; a discipline that aims at the design of algorithm for implementing statistical methods on computers. It has strong ties to mathematical optimization, which delivers methods, theory and application domains to the field. Machine learning is employed in a range of computing tasks where designing and programming explicit algorithms is infeasible. Example applications include weather prediction, optical character recognition (OCR), search engines and computer vision. Machine learning and pattern recognition can be viewed as two facets of the same field. When employed in industrial contexts, machine learning methods may be referred to as predictive analytics or predictive modelling.

The predictive model, utilizing augmented artificial intelligence, configures the processor to implement one or more algorithms to utilize virtual machine learning to generate predictions and alerts based on analyzed large data sets. In accordance with the described embodiment, the predictive module implements different types of machine learning depending on the nature of the learning "signal" or "feedback" available to the 3D visualization system 100.

In a non-limiting example, the predictive module is configured to use supervised learning methods and implementations. For instance, the predictive module configures the processor to evaluate example data inputs and their desired outputs, and generate a general rule that maps inputs to outputs. For instance, the processor is fed data and a goal is set for the engine to solve traffic congestion at a particular location. Here, the inputs are fed manually, obtained from sensors and/or computer vision system utilizing digital image processing. The predictive module then evaluates the input data and the desired output state and generates a solution that is predicted to result in the desired outcome of reduced congestion.

In an alternative embodiment, the predictive module utilizes unsupervised learning implementations. Under this system, no labels are given to the learning algorithm employed by the processor, thus the processor is configured to generate structure from the input. Using such an unsupervised learning approach results in discovering hidden patterns in data which might not be apparent from a manual analysis. As a non-limiting example, a user can generate a 3D stack relating to a particular transit infrastructure such as a bus or train. The user, desiring to navigate to the particular bus that will have the shortest commute time to her desired location, utilizes the unsupervised learning features of the predictive module to take into account changes in routes, time and other factors due to inclement weather, accidents or other events that might cause delay to one or more transit options.

In a further embodiment, the predictive module uses reinforcement learning features implemented as a sub-module of the predictive module. Here the processor is configured to interact with a dynamic environment in which a certain goal (e.g. driving a vehicle) is performed without a user manually providing instructions about the vehicle's proximity to the desired destination. Reinforcement learning can be considered semi-supervised learning, where the submodule configures to the processor to receive an incomplete training signal, such as a training set with some, or often many, of the target outputs missing. For instance, transduction is a special case of this principle where the entire set of problem instances is known at learning time, except that part of the targets are missing.

Other machine learning solutions are also implemented by the processor configured to execute the submodules of the predictive module. For example, in certain embodiments that utilize a robot or autonomous device, developmental learning submodules generate sequences or curriculum of learning situations to cumulatively acquire repertoires of novel skills through autonomous self-exploration and social interaction with human interface. Additionally, the submodules incorporate other guidance mechanisms, such as active learning, prediction etc.

In using machine learning classification of data, inputs are divided into two or more classes, and the learner must produce a model that assigns unseen inputs to one (or multi-label classification) or more of these classes. In one embodiment, classification of data is implemented as a supervised learning routine. In a further machine learning implementation, regression is also implemented as a supervised learning problem. In regression, the outputs are continuous rather than discrete. In clustering, a set of inputs is to be divided into groups.

In a further embodiment, the submodule uses dimensionality reduction algorithms to simplify inputs by mapping high-dimensional data in to a lower-dimensional space. In a non-limiting embodiment, the predictive model configures the processor to implement a topic modeling strategy, such as through a topic modeling sub-module to evaluate a list of human language documents and determine or generate relationships between the documents. Using such a topic modeling submodule the system described extracts useful information relating documents from different places with different language, or formats.

5.4 Real-Time Use of the 3D Data Stack

In one arrangement of the described system and method, the 3D data stack generated in step 250 utilizing the 3D data stack transformation module 310 is transmitted or otherwise communicated to a data and visualization output device 106. In one example of the system described, data and visualization output device 106 is a mobile computing device configured through code executing in a processor thereof to receive the 3D data stack and generate a visualization for an end user as shown is step 260.

In one non-limiting arrangement, the mobile computing device 106 is a smart phone or tablet computer with a display device, coordinate or location devices and a network interface. According to this implementation, the mobile computing device receives the 3D data stack as a wireless data communication from the analysis system 104. However, in an alternative arrangement, the mobile computing device is configured through software modules, such as the data stack transmission module 312 utilized by the analytic system or the transmission module 314 utilized by the display device, to retrieve or cause to transmit to a 3D stack from a remote storage device or service such as a cloud hosting device or service.

The mobile device 106 is configured to permit the user to manipulate and view the 3D data stack in real-time in order to evaluate the results of the query as in step 270. In one configuration, the mobile computing device is equipped with navigational and location aids such as GPS transceivers, altimeters and digital compasses. Utilizing such equipped devices allows the user to align the 3D data stack with the user's orientation at a specific location such that when the device is moved, the portion of the 3D stack displayed by the user device 106. For instance, a processor of the mobile computing device 106 is configured, through the display module 314, to represent changes in the field of view displayed to a user in response to the movement of the device. Here, the movements of the mobile computing device itself or the user and the mobile device together, will cause the view or portion of the 3D stack to change in relation to orientation, angle and elevation of the mobile device.

5.5 VR and AR Devices

In a particular embodiment, the mobile device 106 is a VR display device. In this configuration, the user is immersed in a full scale visualization of the 3D data stack. By moving the VR display device, the data displayed to the user's field of vision will change depending on body position, head position and viewing angle. In an alternative configuration of the system described, the mobile computing device is an AR device that provides the 3D stack as a data overlay on a user's field of vision but allows the user to maintain real time observations of the location in question.

During the visualization interaction, either with a mobile device or altered reality platform (e.g. VR or AR), the user can access tools and functions that allow the 3D data stack to be updated or modified. As shown in step 290, user action such as the placement of a beacon or annotating a location with additional metadata is recorded and added to the 3D data stack currently under visualization. This updated information is transmitted to the analysis system 106 where it can be processed and used to update the copy of the 3D stack residing in the model database 108. The update module 318 configures the processor of the mobile device 106 to transmit this information to the analysis system 104 where data stack update module 320 stores the updated information in the model database 108.

5.6 Autonomous Devices

In a further implementation, the 3D data stack is used by an autonomous or semi-autonomous device in order to path find, analyze or spot check data provided in the 3D data stack. In one non-limiting example, an airborne, submersible or subsurface autonomous device (e.g. drone) utilizes the 3D stack to inspect utility infrastructure with remote sensing devices such as IR scanners, cameras or magnetometers. The autonomous device is configured to take readings or measurements of infrastructure and update the 3D data stack with metadata relating to the current condition or state of the infrastructure. Additionally, the autonomous or semi-autonomous device is used in search and rescue, fire prevention and mitigation, disaster mitigation and relief operations.

The autonomous devices can, in specific embodiments, utilize the predictive module 330 of the system to provide real-time learning systems to execute tasks such as path finding and visual identification. As a non-limiting example, an autonomous vehicle traveling through a geographic area is configured to implement a data update feature whereby the data received by the vehicle is used to update the accuracy of the model data objects in near real time.

In a further embodiment, the system described provides a platform for network enabled vehicle communication and/or autonomous robotic vehicle with multi sensor interface to act upon dynamic changes occurring in environment and update that information back to the database. For example, location data and other information recorded or measured by the autonomous robotic vehicle is transmitted through the document model database and is distributed to other linked or connected autonomous and non-autonomous vehicles to avoid congestion. Based on the information from all the mobile platforms, as well as sensors and other data feeds, the predictive module configures the processor of the system to send a predicted route change to a vehicle to avoid congestion in traffic, or avoid other navigational hazards. In a further arrangement, the mobile computing device 106 is configured to perform, using a check sub-module (data consistency and validity) of the data stack update module 318 to review specific set of data in the model database 108. The check submodule configures the processor to analyze and validate in "real-time" any changes made to the 3D data stack, such as by annotating metadata or updated sensor measurements. The check module configures a processor to initiate a flag and update procedure to the specific 3D data stack being utilized by the user if any parameter changes are recognized. Here, the analytic system is configured to transmit an update to some or all of the 3D data stack being used by the user.

For example, if a sensor on oil and gas infrastructure indicates a change in the safety and continuous operational status, the 3D stack stored in the model database 108 is updated, and the updated status changes are made in real or near real time to any users that are currently accessing or using a 3D stack corresponding to that location. Data from autonomous vehicle/sensors can constantly update the MDOs in the model database 108 to provide improved spatial accuracy for real-time events that can be remotely analyzed by a user. For example, sensors indicating the creation of a new pothole would provide data to the 3D data stack of the location in question such that a remote user could evaluate the size, depth and potential impact of such a change in road surfaces might have on traffic. As another example, changes as a result of real time sensor and traffic pattern updates are analyzed by the prediction engine to provide predictions on future traffic patterns and to suggest real time traffic pattern optimization based on the 3D data stack.

5.7 Tool Sets

The apparatus so described are configured to be extensible and interoperable with future designed tool sets configured to access the stored data models (such as though an API) and run data analysis specific to a particular domain or area of interest. For example, the Transportation Department of a government may have an interface with the analytic system 104 that allows for additional information to be utilized in support of traffic signal analysis and impact, accident analysis, diversion and route analysis and dynamic re-routing tools. Likewise, in agricultural contexts, the analytic system is extensible to accept private or user specific data streams and information to allow the model data to be used and combined with user data for the purposes of crop monitoring, yield prediction, weather impact analysis, drought mitigation and cost predictions.

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous. Patents, patent applications, and publications are cited throughout this application, the disclosures of which, particularly, including all disclosed chemical structures, are incorporated herein by reference. Citation of the above publications or documents is not intended as an admission that any of the foregoing is pertinent prior art, nor does it constitute any admission as to the contents or date of these publications or documents. All references cited herein are incorporated by reference to the same extent as if each individual publication, patent application, or patent, was specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention.

What is claimed is:

1. A computer implemented method, the method comprising:
   selecting a geospatial area for inquiry by generating, using a geospatial query generator, geospatial data corresponding to the geospatial area for the inquiry;
   accessing from a model database a first plurality of data objects relevant to the geospatial area for the inquiry wherein the first plurality of data objects include data related to one or more buildings and subsurface infrastructure;
   determining the model database doesn't contain a specific type of data object relevant to geospatial area for the inquiry;
   in response to determining the model database doesn't contain the specific type of data object relevant to the geospatial area for the inquiry, accessing, from at least one remote database accessible by a processor of the computer, a second plurality of data objects obtained from at least one of a plurality of sensor devices at a given period of time, using an input module configured as code executing in the processor, wherein the second plurality of data objects is relevant to the geospatial area for the inquiry;
   evaluating the format of the each of the second plurality of data objects, using a format check module configured as code executing in the processor, the format check module configured to check the format of each of the second plurality of data objects to determine whether each of the second plurality of data objects is in a compatible format type or an incompatible format type;
   identifying a first portion of the second plurality of data objects are one of a plurality of incompatible format types and storing the first portion of the second plurality of data objects each in one of the incompatible format types as an element in a conversion array;
   converting each of the first portion of the second plurality of data objects in the conversion array, using a conversion module configured as code executing in the processor such that each of the first portion of the second plurality of data objects in one the incompatible format types is converted to one of the compatible format types wherein the converting includes identifying a conversion algorithm for converting each of the first portion of the second plurality of data objects stored in the conversion array from one of the incompatible format types to one of the compatible format types, and applying the identified conversion algorithm to each of the second plurality of data objects to obtain a plurality of converted data objects;
   generating the 3D visualization from 1) the first plurality of data objects from the model database, 2) the plurality of converted data objects from the at least one remote database and 3) a second portion of the second plurality of data objects each in one of the compatible data format types and from the at least one remote database wherein the 3D visualization includes the one or more buildings and the subsurface infrastructure;
   transmitting the 3D visualization to a second computer;
   displaying the 3D visualization to the user using at least one display device integral to the second computer.

2. The computer implemented method of claim 1 wherein the second computer is integral to a virtual reality display device.

3. The computer implemented method of claim 1 wherein the second computer is integral to an autonomous or a semiautonomous device.

4. The computer implemented method of claim 1, further comprising:
   updating a local copy, with the second computer, the first plurality of data objects, the plurality of converted data objects and the second portion of the second plurality of data objects each having the compatible data format type comprising the 3D visualization;
   transmitting the updated local copy to the first computer;
   synchronizing the local copy with a master copy of the updated data accessible by the first computer.

5. A computer implemented method, the method comprising:
   selecting a geospatial area for inquiry by generating, using a geospatial query generator, geospatial data corresponding to the geospatial area for the inquiry;
   accessing from a model database a first plurality of data objects relevant to the geospatial area for the inquiry wherein the first plurality of data objects include data related to one or more buildings;
   accessing, from at least one remote database accessible by a processor of the computer, a second plurality of data objects obtained from at least one of a plurality of sensor devices at a given period of time and possessing geospatial information describing utility infrastructure, using an input module configured as code executing in the processor, wherein the second plurality of data objects is relevant to the geospatial area for the inquiry;
   evaluating the format of the each of the second plurality of data objects including the geospatial information describing the utility infrastructure, using a format check module configured as code executing in the processor, the format check module configured to check the format of each of the second plurality of data objects to determine whether each of the second plurality of data objects is in a compatible format type or an incompatible format type;
   identifying a first portion of the second plurality of data objects with an incompatible format types and storing the first portion of the second plurality of data objects each in one of the incompatible format types as an element in a conversion array;
   converting each of the first portion of the second plurality of data objects in the conversion array, using a conversion module configured as code executing in the processor such that each of the first portion of the second plurality of data objects in one the incompatible format types is converted to one of the compatible format types wherein the converting includes identifying a conversion algorithm for converting each of the first portion of the second plurality of data objects stored in the conversion array from one of the incompatible format types to one of the compatible format types , and applying the identified conversion algorithm to each of the second plurality of data objects to obtain a plurality of converted data objects; and generating a three-dimensional visualization of the one or more buildings and the utility infrastructure from the first plurality of data objects and the plurality of converted data objects.

6. The computer implemented method of claim 1, wherein the data related to the subsurface infrastructure includes a location and a history of underground utilities within the geospatial area under inquiry for a particular time period.

7. The computer implemented method of claim 1, wherein the first geospatial area under inquiry includes a plurality of buildings and wherein the three-dimensional visualization includes a rendering of the plurality of buildings.

8. The computer implemented method of claim 1, wherein the at least one remote database is selected from the group consisting of a municipal database, a zoning database, a planning database, a waste management database and utility databases.

9. The computer implemented method of claim 1, further comprising storing the plurality of converted data objects to the model database.

10. The computer implemented method of claim 1, wherein the 3D visualization shows a path of buried utility infrastructure on a building site.

11. The computer implemented method of claim 1, wherein the 3D visualization shows roads and data related to traffic flow on the roads.

12. The computer implemented method of claim 1, wherein the second computer is a mobile computing device.

13. The computer implemented method of claim 12, wherein the mobile device is located within the geospatial area under inquiry and wherein the 3D visualization is adjusted in response to an orientation of the mobile device such that different portions of the 3D visualization are output depending on the orientation of the mobile device.

14. The computer implemented method of claim 1, wherein the 3D visualization includes a plurality of subsurface structures on a building site.

15. The computer implemented method of claim 1, wherein the first plurality of data objects in the model database include links to other data objects in close proximity to a particular geospatial location.

16. The computer implemented method of claim 1, wherein the second plurality of data objects include information related to zoning regulations within the geospatial area under inquiry.

17. The computer implemented method of claim 3, wherein the autonomous or the semiautonomous device uses information from one or more of the first plurality of data objects, the plurality of converted data objects or the compatible portion of the second plurality of data objects to navigate within the geospatial area under inquiry.

18. The computer implemented method of claim 3, wherein the autonomous or the semiautonomous device is configured include sensors configured to take readings or measurements associated with the one or more buildings or the subsurface infrastructure and the method further comprising updating one or more of the first plurality of data objects, the plurality of converted data objects or the compatible portion of the second plurality of data objects in response to the readings or the measurements.

19. The computer implemented method of claim 3, wherein the autonomous or the semiautonomous device is configured to operate below the surface.

20. The computer implemented method of claim 3, wherein the autonomous or the semiautonomous device is an airborne device.

* * * * *